United States Patent
Grilli et al.

(10) Patent No.: US 8,254,921 B2
(45) Date of Patent: Aug. 28, 2012

(54) DEFAULT CONFIGURATIONS WITH DIFFERENTIAL ENCODING IN A WIRELESS COMMUNICATION SYSTEM

(75) Inventors: Francesco Grilli, San Diego, CA (US); Alkinoos Hector Vayanos, Ann Arbor, MI (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 11/196,970

(22) Filed: Aug. 4, 2005

(65) Prior Publication Data
US 2006/0040645 A1 Feb. 23, 2006

Related U.S. Application Data

(60) Provisional application No. 60/601,429, filed on Aug. 12, 2004.

(51) Int. Cl.
*H04Q 7/20* (2006.01)
(52) U.S. Cl. ............... 455/432.3; 455/418; 455/419; 455/420
(58) Field of Classification Search ............ 455/423.3, 455/418, 419, 420
See application file for complete search history.

(56) References Cited

U.S. PATENT DOCUMENTS

| | | | |
|---|---|---|---|
| 5,864,758 A * | 1/1999 | Moon | 455/424 |
| 5,903,735 A | 5/1999 | Kidder et al. | |
| 6,728,365 B1 | 4/2004 | Li et al. | 379/329 |
| 7,350,205 B2 * | 3/2008 | Ji | 717/172 |
| 2002/0094819 A1 | 7/2002 | Cao et al. | |
| 2003/0081838 A1 | 5/2003 | Teng | |

FOREIGN PATENT DOCUMENTS

| | | |
|---|---|---|
| JP | 2002218531 | 8/2002 |
| TW | 591961 B | 6/2004 |
| TW | 595149 B | 6/2004 |
| WO | WO9952307 A1 | 10/1999 |

OTHER PUBLICATIONS

International Search Report and Written Opinion—PCT/US2005/029054, International Search Authority—European Patent Office—Feb. 16, 2006.
European Search Report—EP10196627, Search Authority—Munich Patent Office, Feb. 18, 2011.

(Continued)

*Primary Examiner* — Charles Shedrick
(74) *Attorney, Agent, or Firm* — Michael J. DeHaemer

(57) ABSTRACT

Techniques for efficiently configuring and reconfiguring calls using a set of default configurations and differential encoding are described. At the network side, a configuration to use for communication with a wireless device is initially selected. A default configuration is identified from among a set of default configurations. The differences, if any, between the selected configuration and the default configuration are ascertained. An identity for the default configuration and the differences, if any, are sent to the wireless device to convey the selected configuration. At the wireless device, the message containing the identity for the default configuration is initially received. The default configuration is obtained from a memory based on the identity. A determination is made whether the message contains differences between the default configuration and the selected configuration. Values for the default configuration are replaced with the differences, if any, sent in the message.

48 Claims, 7 Drawing Sheets

OTHER PUBLICATIONS

Qualcomm Europe: "Default configurations in Rel-6" 3GPP Draft ; R2-042410, 3rd Generation Partnership Project (3GPP), Mobile Competence Centre ; 650, Route Des Lucioles ; F-06921 Sophia-Antipolis Cedex ; France, vol. RAN WG2, No. Yokohama, Japan; 20041112, Nov. 12, 2004, XP050126981, [ retrieved on Nov. 12, 2004].

"Universal Mobile Telecommunications System (UMTS); Radio resource management strategies 3GPP TR 25.922 V6.0.1 release 6; ETSI TR 125 922" ETSI Standards, European Telecommunications Standards Institute, Sophia-Antipo, FR. vol. 3-R2, No. V601, Apr. 2004, paragraphs 5.1.5.2.2-5.1.5.3.

Leoleis G. et al.: "Mobility management for multicast sessions in a UMTS-IP converged environment." Computers and Communications, 2004. Proceedings. ISCC 2004. Ninth International Symposium on Alexandria, Egypt, Jun. 28-Jul. 1, 2004, Piscataway, NJ, USA, IEEE, vol. 1, Jun. 28, 2004, pp. 506-511, XP010741969 ISBN: 0-7803-8623-X, sentences 1-13, paragraph 2.

3GPP TS 25.331 V6.8.0 (Dec. 2005). $3^{rd}$ Generation Partnership Project; Technical Specification Group Radio Access Network; Radio Resource Control (RRC); Protocol Specification (Release 6). pp. 41-44, 532-549, 1020-1051.

Taiwan Search Report—TW094127432—TIPO—Nov. 7, 2011.

* cited by examiner

DEFAULT CONFIGURATIONS WITH DIFFERENTIAL ENCODING IN A WIRELESS COMMUNICATION SYSTEM

CLAIM OF PRIORITY UNDER 35 U.S.C. §119

The present Application for Patent claims priority to Provisional Application Ser. No. 60/601,429, entitled "Default Configurations with Differential Encoding in a Wireless Communication System," filed Aug. 12, 2004, assigned to the assignee hereof, and expressly incorporated herein by reference.

BACKGROUND

I. Field

The present disclosure relates generally to communication, and more specifically to techniques for configuring and reconfiguring calls in a wireless communication system.

II. Background

Wireless communication systems are widely deployed to provide various communication services such as voice, video, data, messaging, and so on. These systems may be multiple-access systems capable of supporting communication with multiple users by sharing the available system resources (e.g., bandwidth and/or transmit power).

A wireless device (e.g., a cellular phone) may operate in one of several modes, such as an idle mode or a connected mode, at any given moment. In the idle mode, the wireless device may monitor a paging channel for page messages that alert the wireless device to the presence of an incoming call and/or overhead messages that carry system and other information for the wireless device. In the connected mode, the wireless device may actively exchange data with one or more base stations in the system, e.g., for a voice or data call.

The wireless device may perform configuration when transitioning from the idle mode to the connected mode and may perform reconfiguration while in the connected mode. Configuration refers to setup of various parameters to use for communication. Reconfiguration refers to modification of parameters used for communication. Reconfiguration may be performed for various reasons such as, e.g., to change a data rate, to change or add a service, to change the quality of service (QoS) for an existing service, to hand over from one frequency to another frequency (e.g., to balance system loading), to change state within the connected mode (e.g., in order to conserve power at the wireless device), and so on.

For reconfiguration, the wireless device and the wireless system typically exchange signaling or messages to convey various parameters to use for transmission on the downlink and uplink. These parameters may indicate, e.g., the channels, data rate, encoding scheme, data block size, and so on, to use for each link. A reconfiguration message may be very long, especially if there are many parameters to exchange. A long reconfiguration message typically requires a long time to transmit and possibly retransmit for successful reception, consumes valuable radio resources, and causes a long delay for reconfiguration, all of which are undesirable.

There is therefore a need in the art for techniques to more efficiently perform configuration and reconfiguration in a wireless communication system.

SUMMARY

Techniques for efficiently configuring and reconfiguring calls (e.g., voice and/or data calls) are described herein. These techniques use a set of default configurations and differential encoding to reduce the amount of signaling to send to configure or reconfigure a call. A default configuration is a configuration that is known a priori by both a wireless system and a wireless device, and a configuration is a set of values for a set of parameters to use for communication. The set of default configurations may be defined in a standard that is supported by both the wireless system and the wireless device. Differential encoding refers to conveying a configuration selected for use with a default configuration and the differences, if any, between the selected configuration and the default configuration.

According to an embodiment of the invention, an apparatus is described which includes a memory and a processor. The memory stores a set of default configurations, with each default configuration being associated with a respective set of parameter values to use for communication. The processor selects a configuration to use for communication with a wireless device, ascertains the differences, if any, between the selected configuration and a default configuration, and sends an identity for the default configuration and the differences, if any, to convey the selected configuration.

According to another embodiment, a method is provided in which a configuration to use for communication with a wireless device is selected. A default configuration is identified from among a set of default configurations. Differences, if any, between the selected configuration and the default configuration are ascertained. An identity for the default configuration and the differences, if any, are sent to convey the selected configuration.

According to yet another embodiment, an apparatus is described which includes means for selecting a configuration to use for communication with a wireless device, means for identifying a default configuration from among a set of default configurations, means for ascertaining the differences, if any, between the selected configuration and the default configuration, and means for sending an identity for the default configuration and the differences, if any, to convey the selected configuration.

According to yet another embodiment, a processor readable media is described which stores instructions operable to select a configuration to use for communication with a wireless device, to identify a default configuration from among a set of default configurations, to ascertain the differences, if any, between the selected configuration and the default configuration, and to send an identity for the default configuration and the differences, if any, to convey the selected configuration.

According to yet another embodiment, an apparatus is described which includes a memory and a processor. The memory stores a set of default configurations. The processor receives an indication of a change in communication requirements for a wireless device that is operating in a connected mode, selects a default configuration from among the set of default configurations based on the communication requirements, and sends the default configuration to the wireless device.

According to yet another embodiment, a method is provided in which an indication of a change in communication requirements for a wireless device that is operating in a connected mode is received. A default configuration is selected from among a set of default configurations based on the communication requirements and sent to the wireless device.

According to yet another embodiment, an apparatus is described which includes means for receiving an indication of a change in communication requirements for a wireless device that is operating in a connected mode, means for selecting a default configuration from among a set of default configurations based on the communication requirements, and means for sending the default configuration to the wireless device.

According to yet another embodiment, an apparatus is described which includes a memory and a processor. The memory stores a set of default configurations. The processor receives a message containing an identity for a default configuration, obtains the default configuration from the memory based on the identity, ascertains whether the message contains differences between the default configuration and a selected configuration, and replaces values for the default configuration with the differences, if any, sent in the message.

According to yet another embodiment, a method is provided in which a message containing an identity for a default configuration is received. The default configuration is obtained (e.g., from memory) based on the identity. A determination is made whether the message contains differences between the default configuration and a selected configuration. Values for the default configuration are replaced with the differences, if any, sent in the message.

According to yet another embodiment, an apparatus is described which includes means for receiving a message containing an identity for a default configuration, means for obtaining the default configuration based on the identity, means for ascertaining whether the message contains differences between the default configuration and a selected configuration, and means for replacing values for the default configuration with the differences, if any, sent in the message.

According to yet another embodiment, a processor readable media is described which stores instructions operable in a wireless device to receive a message containing an identity for a default configuration, to obtain the default configuration based on the identity, to ascertain whether the message contains differences between the default configuration and a selected configuration, and to replace values for the default configuration with the differences, if any, sent in the message.

According to yet another embodiment, an apparatus is described which includes a memory and a processor. The memory stores a set of default configurations. The processor receives a reconfiguration message in response to a change in communication requirements for a wireless device that is operating in a connected mode, extracts an identity for a default configuration from the reconfiguration message, obtains the default configuration from the memory based on the identity, and uses the default configuration for communication.

According to yet another embodiment, a method is provided in which a reconfiguration message is received in response to a change in communication requirements for a wireless device that is operating in a connected mode. An identity for a default configuration is extracted from the reconfiguration message. The default configuration is obtained from a memory based on the identity and used for communication.

According to yet another embodiment, an apparatus is described which includes means for receiving a reconfiguration message in response to a change in communication requirements for a wireless device that is operating in a connected mode, means for extracting an identity for a default configuration from the reconfiguration message, means for obtaining the default configuration from a memory based on the identity, and means for using the default configuration for communication.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, and so on. A CDMA system may implement one or more CDMA radio access technologies (RATs) such as Wideband-CDMA (W-CDMA), cdma2000, and so on. cdma2000 covers IS-2000, IS-856, and IS-95 standards. A TDMA system may implement one or more TDMA RATs such as Global System for Mobile Communications (GSM), Digital Advanced Mobile Phone System (D-AMP), and so on. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the techniques are described below for Universal Mobile Telecommunication System (UMTS), which utilizes W-CDMA for over-the-air communication.

Figure 1:
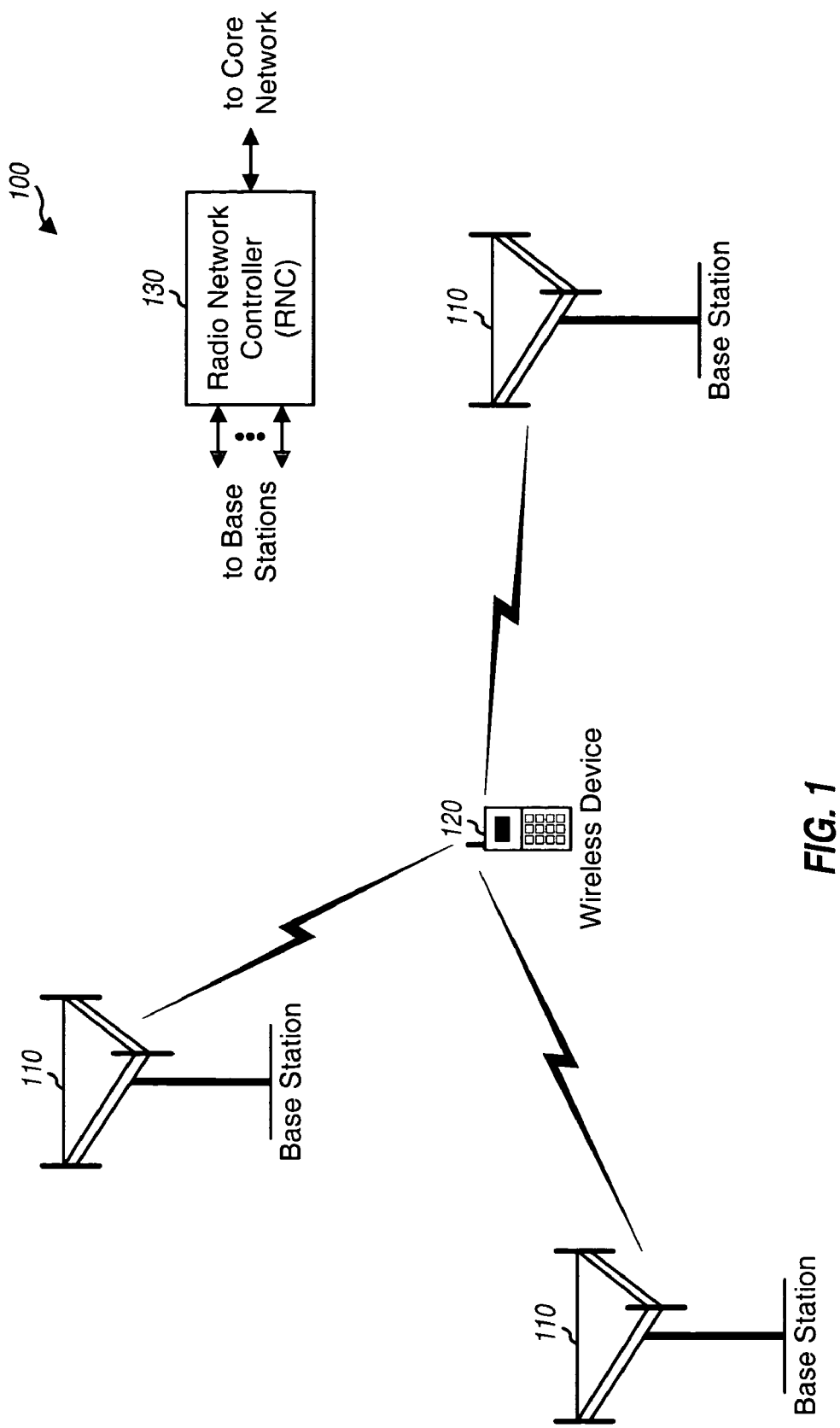
FIG. 1 shows a UMTS Terrestrial Radio Access Network (UTRAN).

FIG. 1 shows a UMTS Terrestrial Radio Access Network (UTRAN) 100, which includes a number of base stations that communicate with a number of wireless devices. For simplicity, only three base stations 110 and one wireless device 120 are shown in FIG. 1. A base station is a fixed station and may also be called a Node B, a base transceiver subsystem (BTS), an access point, or some other terminology. Each base station provides communication coverage for a particular geographic area. A base station and/or its coverage area may be referred to as a "cell", depending on the context in which the term is used. A wireless device may be fixed or mobile and may also be called a user equipment (UE), a mobile station, a terminal, or some other terminology. A wireless device may communicate with one or more base stations on the downlink and/or uplink at any given moment, depending on whether the wireless device is active, whether soft handover is supported, and whether the wireless device is in soft handover. The downlink (or forward link) refers to the communication link from the base stations to the wireless devices, and the uplink (or reverse link) refers to the communication link from the wireless devices to the base stations. A radio network controller (RNC) 130 couples to base stations 110 and provides coordination and control for these base stations. In the following description, the wireless device is referred to as the UE, and the network side (e.g., the Node Bs and RNC) is referred to as the UTRAN.

Figure 2:
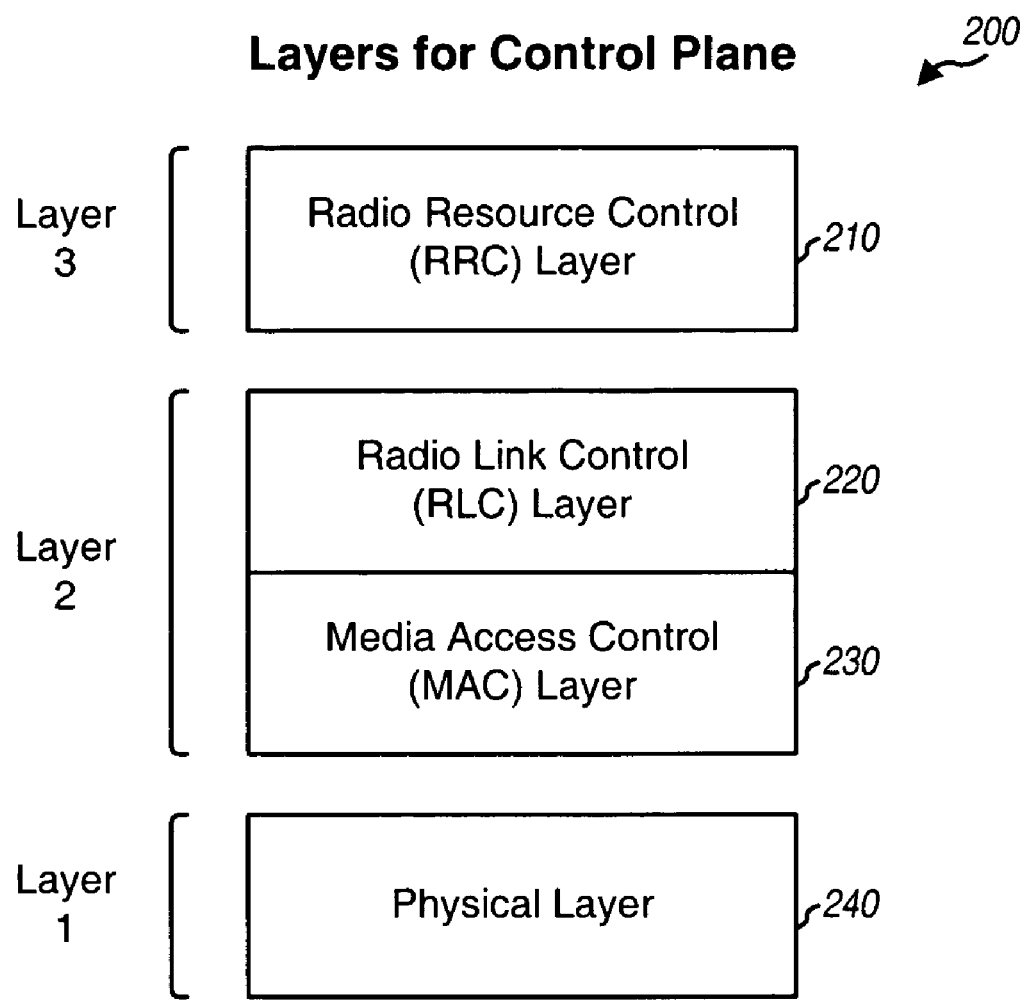
FIG. 2 shows a protocol stack defined by 3GPP Release 6.

FIG. 2 shows a protocol stack 200 defined by 3GPP Release 6. Protocol stack 200 includes a Radio Resource Control (RRC) layer 210, a Radio Link Control (RLC) layer 220, a Medium Access Control (MAC) layer 230, and a physical layer 240. RRC layer 210 is a sublayer of Layer 3. RLC layer 220 and MAC layer 230 are sublayers of Layer 2, which is often called a data link layer. Physical layer 240 is often called Layer 1.

The RRC layer provides information transfer service to a Non Access Stratum (NAS), which is a functional layer that supports traffic and signaling messages between the UE and a core network (CN) with which the UTRAN interfaces. The RRC layer is also responsible for controlling the configuration of Layers 1 and 2. The RLC layer provides reliability for data transmission and performs automatic retransmission of data. In the RLC layer, data is processed as belonging to logical channels. The MAC layer maps and/or multiplexes logical channels to transport channels and processes (e.g., encodes, interleaves, and rate matches) data for each transport channel. The physical layer provides a mechanism for transmitting data for the MAC layer and signaling for higher layers. The physical layer maps transport channels to physical channels, processes (e.g., channelizes and scrambles) data for each physical channel, and performs power control for each set of physical channels.

On the network side, the physical layer is typically implemented at the Node Bs, and the RLC, MAC, and RRC layers are typically implemented at the RNC. The layers for 3GPP are described in various 3GPP documents.

Figure 3:
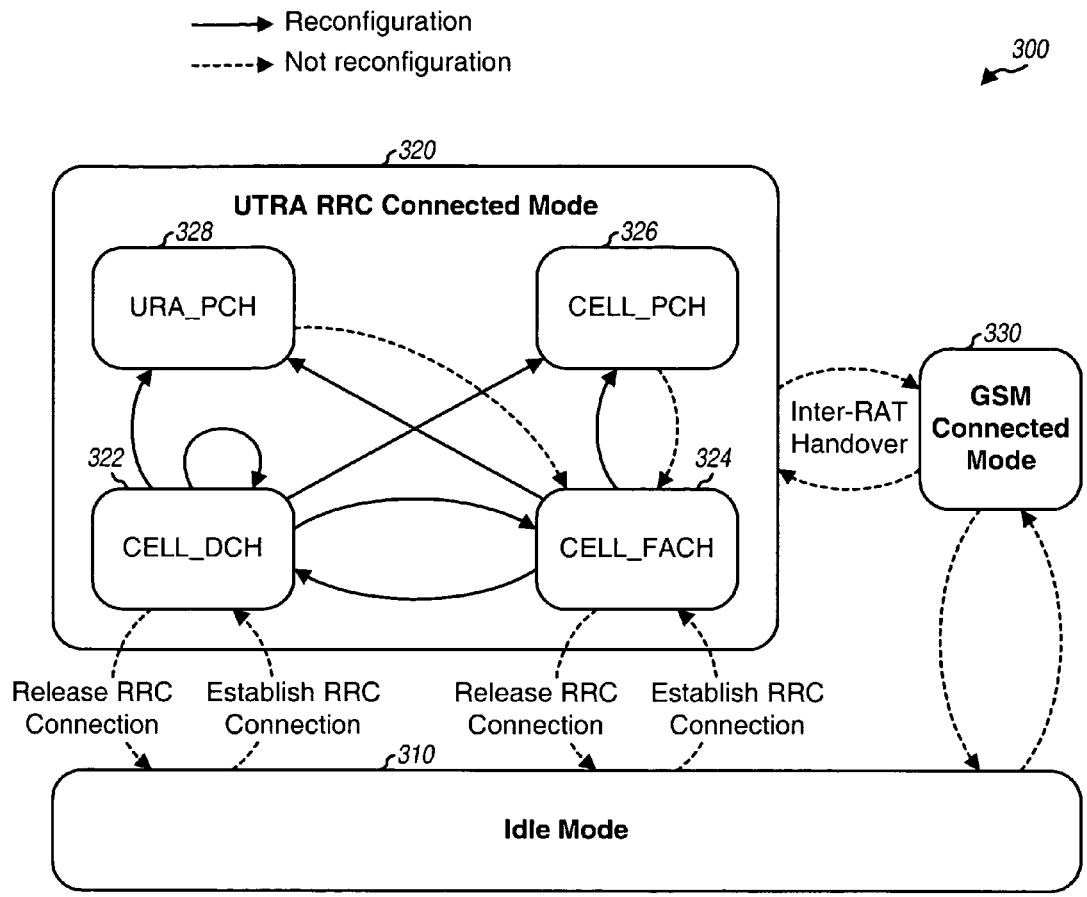
FIG. 3 shows a state diagram of different states and modes for a UE.

FIG. 3 shows a state diagram 300 of the states and modes for a UE in 3GPP. For simplicity, state diagram 300 only shows pertinent states and modes, not all possible states and modes. Upon being powered on, the UE performs cell selection to find a suitable cell from which to receive service. The UE may then transition to an Idle mode 310, a UTRA RRC Connected mode 320, or a GSM Connected mode 330, depending on whether there is any activity for the UE and whether the UE is communicating with the UTRAN or a GSM/EDGE Radio Access Network (GERAN). In the Idle mode, the UE has registered with a network, is listening for paging messages, and updates its location with the network when necessary. The UE can receive and/or transmit data, depending on its state and configuration, with the UTRAN in the UTRA RRC Connected mode and with the GERAN in the GSM Connected mode. The UE may transition between the UTRA RRC Connected mode and the GSM Connected mode for a handover between UMTS and GSM.

While in the UTRA RRC Connected mode, the UE may be in one of four possible RRC states: a CELL_DCH state 322, a CELL_FACH state 324, a CELL_PCH state 326, or a URA_PCH state 328, where DCH denotes dedicated transport channel, FACH denotes forward access channel, PCH denotes paging channel, and URA denotes UTRAN registration area. Table 1 provides short descriptions for the four RRC states. The modes and states are described in detail in 3GPP TS 25.331 V6.2.

TABLE 1

| State | Description |
| --- | --- |
| CELL_DCH | a dedicated physical channel is allocated to the UE for the uplink and downlink; and a combination of dedicated and shared transport channels is available to the UE. |
| CELL_FACH | no dedicated physical channels are allocated to the UE; a default common or shared transport channel on the uplink is assigned to the UE for use to access the network; and the UE continuously monitors the FACH on the downlink for signaling such as Reconfiguration messages. |
| CELL_PCH and URA_PCH | no dedicated physical channels are allocated to the UE; the UE periodically monitors the PCH for paging messages; and the UE is not permitted to transmit on the uplink. |

The UE may transition (1) from the Idle mode to the CELL_DCH state or CELL_FACH state by performing an Establish RRC Connection procedure and (2) from the CELL_DCH state or CELL_FACH state to the Idle mode by performing a Release RRC Connection procedure. The UE may transition (1) from the CELL_DCH state or CELL_FACH state to another state in the UTRA RRC Connected mode by performing a reconfiguration procedure and (2) between different configurations in the CELL_DCH state by also performing a reconfiguration procedure. The UTRAN may command the UE to be in one of the four states in the UTRA RRC Connected mode based on UE activity. The connection and reconfiguration procedures are described in 3GPP TS 25.331 V6.2. In FIG. 3, transitions in which reconfigurations are performed are shown by solid lines with a single arrow, and transitions in which reconfigurations are not performed are shown by dashed lines with a single arrow.

3GPP defines reconfiguration procedures for radio bearer (RB) reconfiguration, transport channel (TrCH) reconfiguration, and physical channel reconfiguration. A radio bearer is a service provided by Layer 2 for the transfer of traffic data between the UE and the UTRAN. One or multiple radio bearers may be maintained by peer entities on Layer 2 in the UE and the UTRAN. Each radio bearer is associated with a specific configuration for the logical, transport, and physical channels. For example, the configuration for each radio bearer may describe the particular channels to use, the rate for each channel, the channelization code (OVSF code) for the physical channel, and so on. The configuration for each radio bearer is dependent on the amount of activity at the UE. For example, the UE may be placed in (1) the CELL_DCH state if the UE has data to transmit or receive or (2) the CELL_FACH state if the UE has no data to transmit or receive. The UE may also change its configuration if the amount of activity changes. A change in the configuration of the UE is effectuated by performing a reconfiguration procedure.

Figure 4:
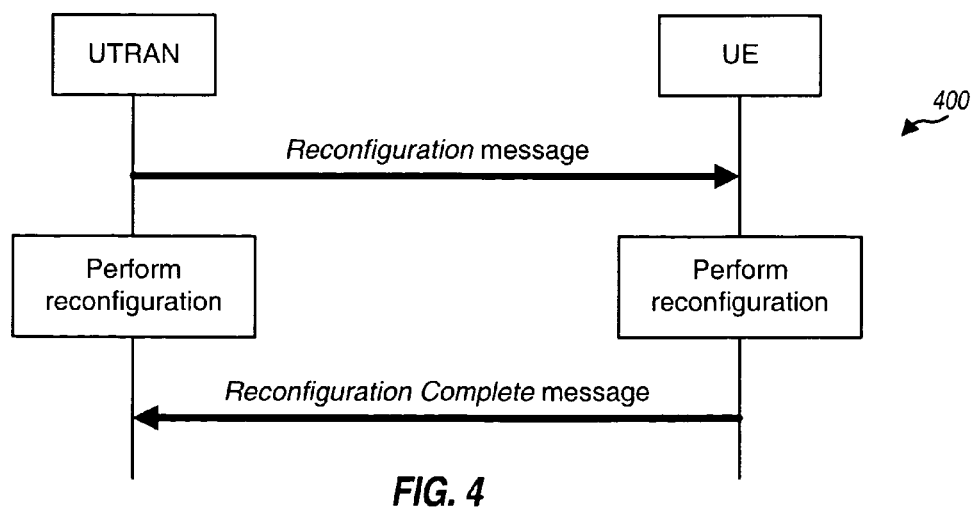
FIG. 4 shows a signaling flow for a reconfiguration procedure.

FIG. 4 shows a signaling flow 400 for a reconfiguration procedure. The UTRAN initiates the reconfiguration procedure by sending a Reconfiguration message that may include (1) pertinent information for the new configuration, e.g., new parameter values for the transport and physical channels, and (2) an activation time, which is the time when the reconfiguration is to be applied. The UTRAN may initiate reconfiguration by itself or in response to receiving signaling from the UE. Upon successfully receiving the Reconfiguration message, the UE performs reconfiguration of the channel(s) that are being modified. The UTRAN similarly performs reconfiguration of the modified channel(s). The UE then sends a Reconfiguration Complete message if the reconfiguration is successful (as shown in FIG. 4) or a Reconfiguration Failure message if the reconfiguration is unsuccessful (not shown in FIG. 4).

Different messages may be sent by the UTRAN and the UE depending on which reconfiguration procedure is being performed. For example, Radio Bearer Reconfiguration and Radio Bearer Reconfiguration Complete messages may be sent for radio bearer reconfiguration, Transport Channel Reconfiguration and Transport Channel Reconfiguration Complete messages may be sent for transport channel reconfiguration, and Physical Channel Reconfiguration and Physical Channel Reconfiguration Complete messages may be sent for physical channel reconfiguration. The Reconfiguration and Reconfiguration Complete messages in FIG. 4 are intended to be generic messages that may correspond to any one of the above message pairs or some other message pair.

Reconfiguration message typically contains various information elements (IEs) for various parameters that are pertinent for communication, as described below. For example, a Radio Bearer Reconfiguration message may include UE information elements, CN information elements, UTRAN mobility information elements, RB information elements, TrCH information elements for downlink and uplink transport channels, and so on. A Reconfiguration message is typically very large.

Reconfiguration message may be processed as one or multiple protocol data units (PDUs) at the RLC layer, depending on the overall message size. Each PDU may be transmitted in one transmission time interval (TTI), which is typically 40 milliseconds (ms) for signaling. The UTRAN transmits the entire Reconfiguration message once. The UE sends a negative acknowledgment (NAK) for each PDU that is not received correctly, and the UTRAN may retransmit this PDU one or more times until the UE receives the PDU correctly. Table 2 shows the probability of receiving the Reconfiguration message in error for different numbers of PDUs and for different numbers of retransmission. Table 2 assumes that the probability of receiving any given PDU in error is 5%, the probability of receiving any NAK in error is 5%, and that the UE needs to receive all PDUs correctly for the message.

TABLE 2

| Number of PDUs for Message | 0 Retransmission | 1 Retransmission | 2 Retransmissions | 3 Retransmissions |
| --- | --- | --- | --- | --- |
| 1 | 5.00% | 0.49% | 0.05% | 0.00% |
| 2 | 9.75% | 0.97% | 0.10% | 0.01% |
| 3 | 14.26% | 1.46% | 0.14% | 0.01% |
| 4 | 18.55% | 1.94% | 0.19% | 0.02% |
| 5 | 22.62% | 2.41% | 0.24% | 0.02% |
| 6 | 26.49% | 2.89% | 0.28% | 0.03% |
| 7 | 30.17% | 3.36% | 0.33% | 0.03% |
| 8 | 33.66% | 3.83% | 0.38% | 0.04% |

For the example shown in Table 2, the UE receives the Reconfiguration message correctly with a probability of 99% or better (which corresponds to a probability of message error of 1% or lower) after one retransmission if the message is composed of two PDUs or fewer and after two retransmissions if the message is composed of more than two PDUs. Each PDU may be sent in one 40-ms TTI, the delay for a retransmission may be 200 ms, and the processing time at the UE may be 100 ms. In this case, the total transmission and processing time for a message with two PDUs (with one retransmission) may be computed as: (2×40)=80 ms for transmission+200 ms for retransmission delay+100 ms for UE processing time=380 ms total delay. The total transmission and processing time for a message with eight PDUs (with two retransmissions) may be computed as: (8×40)=320 ms for transmission+400 ms for two retransmissions+100 ms for UE processing time=820 ms total delay. The Reconfiguration message size is often 4 to 8 PDUs for 3GPP Release 6 and earlier.

The reconfiguration takes effect at the activation time indicated in the Reconfiguration message. The UTRAN may set the activation time sufficiently far into the future to allow for a sufficient number of transmission and retransmissions of the message in order to achieve a given desired probability of correct reception by the UE. If the message is received correctly after the activation time, then the reconfiguration procedure will fail and, in some cases (e.g., for reconfiguration of compressed mode patterns), there will be a radio link failure. For the example described above, the UTRAN may set the activation time 380 ms into the future if the Reconfiguration message is composed of two PDUs or 820 ms into the future if the message is composed of eight PDUs. These activation times ensure that the UE will correctly receive the Reconfiguration message with a probability of 99% or better. The activation time may be set further into the future to achieve a higher (e.g., 99.9%) probability of correct reception.

The transmission time for the Reconfiguration message may be a fairly significant portion of the total time for the reconfiguration procedure. For the example described above, the transmission time for a short message (with two PDUs) is 380 ms, and the transmission time for a long message (with eight PDUs) is 820 ms. The difference between the transmission times for the short and long messages is 440 ms. The total time for the reconfiguration procedure may thus be reduced by a significant amount by sending a short Reconfiguration message. The analysis above does not take into account the amount of time needed to perform ASN.1 encoding at the UTRAN and ASN.1 decoding at the UE, which may yield additional time reduction when sending a short message versus a long message. Hence, a shorter Reconfiguration message is highly desirable to achieve the goal of minimizing the amount of time to successfully deliver the message.

A set of default configurations may be defined for configurations that are commonly used for communication. Each default configuration may be associated with a unique identity and specific values for a specific set of parameters or information elements. The identity may also be called an identifier, an index, and so on. A given default configuration may be efficiently sent in a Reconfiguration message by including only the identity (instead of all of the information elements) for this default configuration in the message. The use of default configurations may greatly reduce message size, which may shorten the total time for reconfiguration.

The set of default configurations may be defined for different classes of services such as, e.g., Conversational, Streaming, Interactive, and Background classes. The Conversation class is characterized by stringent and low delay and a limited delay variation in order to preserve time relation between information entities. Some exemplary applications bearing such traffic are speech, video, and video conferencing. The Streaming class is characterized by a limited delay variation, and some exemplary applications bearing such traffic are facsimile and streaming audio and video. The Interactive class is characterized by a request/response pattern and preservation of payload contents (or low packet error rate). An exemplary application bearing such traffic is web browsing. The Background class is characterized by a relatively insensitive delivery time and preservation of payload contents. An exemplary application bearing such traffic is background downloading of e-mails.

In an embodiment, default configurations for the Conversational class are defined first, since these configurations are typically the most demanding in terms of latency. Default configurations for Streaming, Interactive, and Background classes may then be defined as appropriate. This embodiment may reduce the size of the default configuration set. In another embodiment, the configurations described in TS 25.993 V6.10 may be examined, and a subset of these configurations may be selected as the set of default configurations. In yet another embodiment, the default configuration described in TS 25.331 V6.2, which are listed in Table 3, may be used as the default configurations. In Table 3, CS stands for circuit switched. The default configurations in TS 25.331 V6.2 are conventionally used for (1) RRC connection establishment when transitioning from the Idle mode to the Connected mode and (2) handover from GSM to UMTS. In general, each default configuration is associated with specific default values for a specific set of information elements. The information elements and their default values for the default configurations shown in Table 3 are given in TS 25.331 V6.2, section 13.7.

TABLE 3

Default Configurations in TS 25.331

| Default Configuration Identity | Description |
| --- | --- |
| 0 | 4 kbps signaling |
| 1 | 13.6 kbps signaling |
| 2 | 7.95 kbps speech + 3.4 kbps signaling |
| 3 | 12.2 kbps speech + 3.4 kbps signaling |
| 4 | 28.8 kbps conversational CS-data + 3.4 kbps signaling |
| 5 | 32 kbps conversational CS-data + 3.4 kbps signaling |
| 6 | 64 kbps conversational CS-data + 3.4 kbps signaling |
| 7 | 14.4 kbps streaming CS-data + 3.4 kbps signaling |
| 8 | 28.8 kbps streaming CS-data + 3.4 kbps signaling |
| 9 | 57.6 kbps streaming CS-data + 3.4 kbps signaling |
| 10 | 12.2 kbps speech (multimode) + 3.4 kbps signaling |
| 11 | 10.2/6.7/5.9/4.75 kbps speech + 3.4 kbps signaling |
| 12 | 7.4/6.7/5.9/4.75 kbps speech + 3.4 kbps signaling |
| 13 | 12.65/8.85/6.6 kbps speech + 3.4 kbps signaling |

Regardless of which set of default configurations is selected for use, there may be many instances in which the configurations selected for use are not included in the default configuration set. In each such instance, the selected configuration may be conveyed by sending a Reconfiguration message that contains all of the information elements for this configuration. The transmission time for this Reconfiguration message may be long, as described above.

In an aspect, differential encoding may be used for selected configurations that are not included in the default configuration set. Differential encoding allows for efficient transmission of a selected configuration that does not exactly match any of the default configurations. This is achieved by sending (1) an identity for a default configuration that most closely matches the selected configuration and (2) the differences between the selected configuration and the default configuration.

In general, the selected configuration may be sent using minimum, partial, or full signaling. For minimum signaling, only the identity of the default configuration is sent. For partial signaling, the identity of the default configuration and the differences between the selected configuration and the default configuration are sent. For full signaling, the complete selected configuration is sent.

Figure 5:
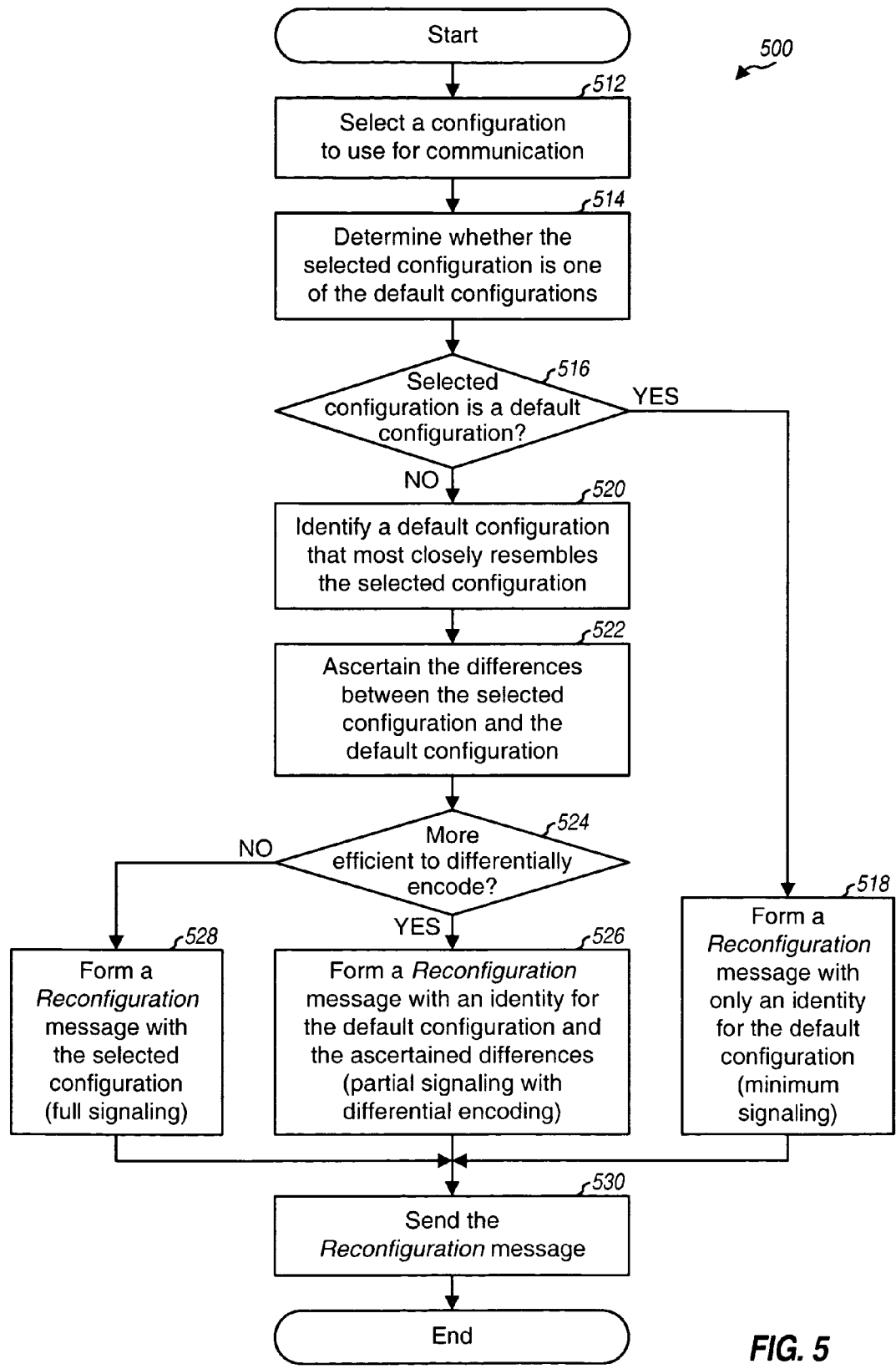
FIG. 5 shows a process for sending a Reconfiguration message using default configurations with differential encoding.

FIG. 5 shows an embodiment of a process 500 for sending a Reconfiguration message using default configurations with differential encoding. A configuration to use for communication is initially selected (block 512). The configuration may be selected in response to a change in communication requirements for the UE, which may result from a change in data rate, a change in service, a change in QoS, a change in state within the UTRA RRC Connected mode, a transition from the Idle mode to the UTRA RRC Connected mode or the GSM Connected mode, a handover from one RAT to another RAT (e.g., from GSM to UMTS, or from UMTS to GSM), and so on, or a combination thereof. The configuration may be selected by a radio resource management entity at the UTRAN based on the communication requirements for the UE, network loading, and/or other factors.

A determination is then made whether the selected configuration is one of the default configurations (block 514). If the selected configuration is a default configuration, as determined in block 516, then the Reconfiguration message is efficiently formed with only the identity for the default configuration, and the selected configuration is sent with minimum signaling (block 518).

If the selected configuration is not a default configuration and the answer is 'No' for block 516, then the default configuration that most closely resembles the selected configuration is identified (block 520). The differences between the selected configuration and the default configuration are ascertained (block 522). The differences may be in one or multiple information elements. A determination is then made whether it would be more efficient to differentially encode the selected configuration as opposed to sending the entire selected configuration (524). If it is more efficient to differentially encode, then the Reconfiguration message is formed based on the identity for the default configuration and the ascertained differences, and the selected configuration is sent with partial signaling (block 526). Otherwise, the Reconfiguration message is formed with all of the information elements for the selected configuration, and the selected configuration is sent with full signaling (block 528). The Reconfiguration message is then sent to the UE (block 530).

FIG. 5 shows a specific process for generating the Reconfiguration message using default configurations and differential encoding. The differential encoding may also be performed in other manners. For example, the default configuration that most closely meets the communication requirements for the UE may be selected from the default configuration set. This default configuration may be modified as needed to meet the communication requirements. The modifications would represent the differences between the selected configuration and the default configuration and may be sent with partial signaling.

Figure 6:
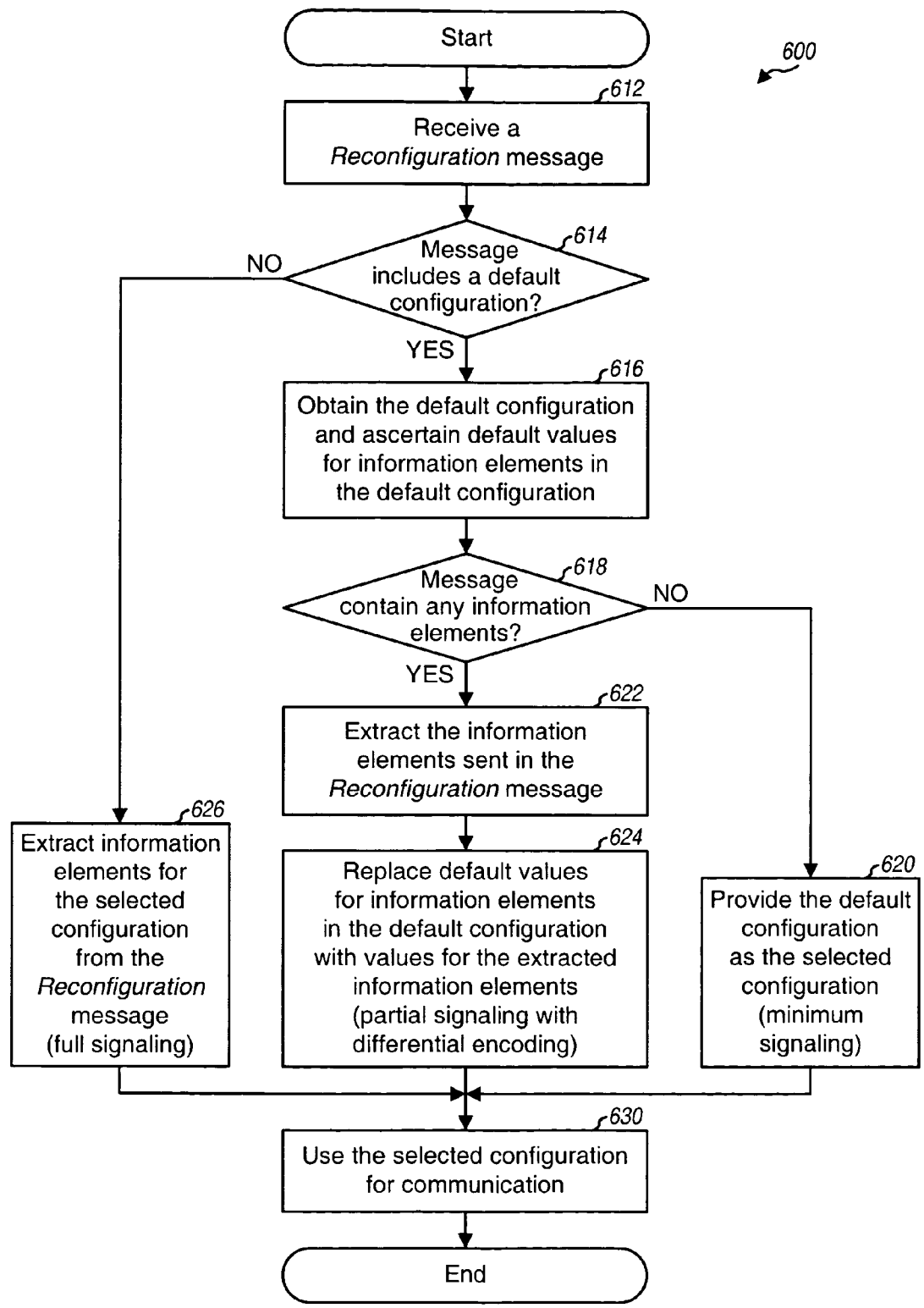
FIG. 6 shows a process for receiving a Reconfiguration message that has been sent using default configurations with differential encoding.

FIG. 6 shows an embodiment of a process 600 performed by the UE for receiving a Reconfiguration message that has been sent using default configurations with differential encoding. The Reconfiguration message is initially received from the UTRAN (block 612). A determination is made whether the Reconfiguration message contains an identity for a default configuration (block 614). If the answer is 'Yes', then the default configuration is obtained (e.g., from a memory within the UE) based on the identity, and the default values for the information elements in the default configuration are ascertained (block 616). A determination is then made whether the Reconfiguration message contains any additional information elements (block 618). If the answer is 'No', then the selected configuration is sent with minimum signaling, and the default configuration is provided as the selected configuration (block 620). Otherwise, if the answer is 'Yes' for block 618, then the selected configuration is sent with partial signaling, and the information elements sent in the Reconfiguration message are extracted (block 622). The default values for the corresponding information elements in the default configuration are replaced with the values for the extracted information elements (block 624). The default values for all other information elements in the default configuration are retained. Back in block 614, if a default configuration is not sent in the Reconfiguration message, then the selected configuration is sent with full signaling, and the information elements for the selected configuration are extracted from the message (block 626). Regardless of how the selected configuration was sent, the selected configuration is used for communication (block 630).

The use of default configurations with differential encoding may greatly reduce the amount of signaling for cases in which a selected configuration is slightly different from a default configuration. As an example, the UTRAN may select a configuration that is identical to a default configuration, except for the value of an "RLC Info" information element. In this case, the UTRAN may send to the UE the identity of the default configuration and only the "RLC Info" information element with the desired value. The UE would obtain the default configuration based on the identity and would replace or override the content of the "RLC Info" information element with the value received from the UTRAN. With differential encoding, if a single parameter or a few parameters are changed with respect to a default configuration, then only the changed parameter(s), instead of the full configuration, are sent.

Figure 7:
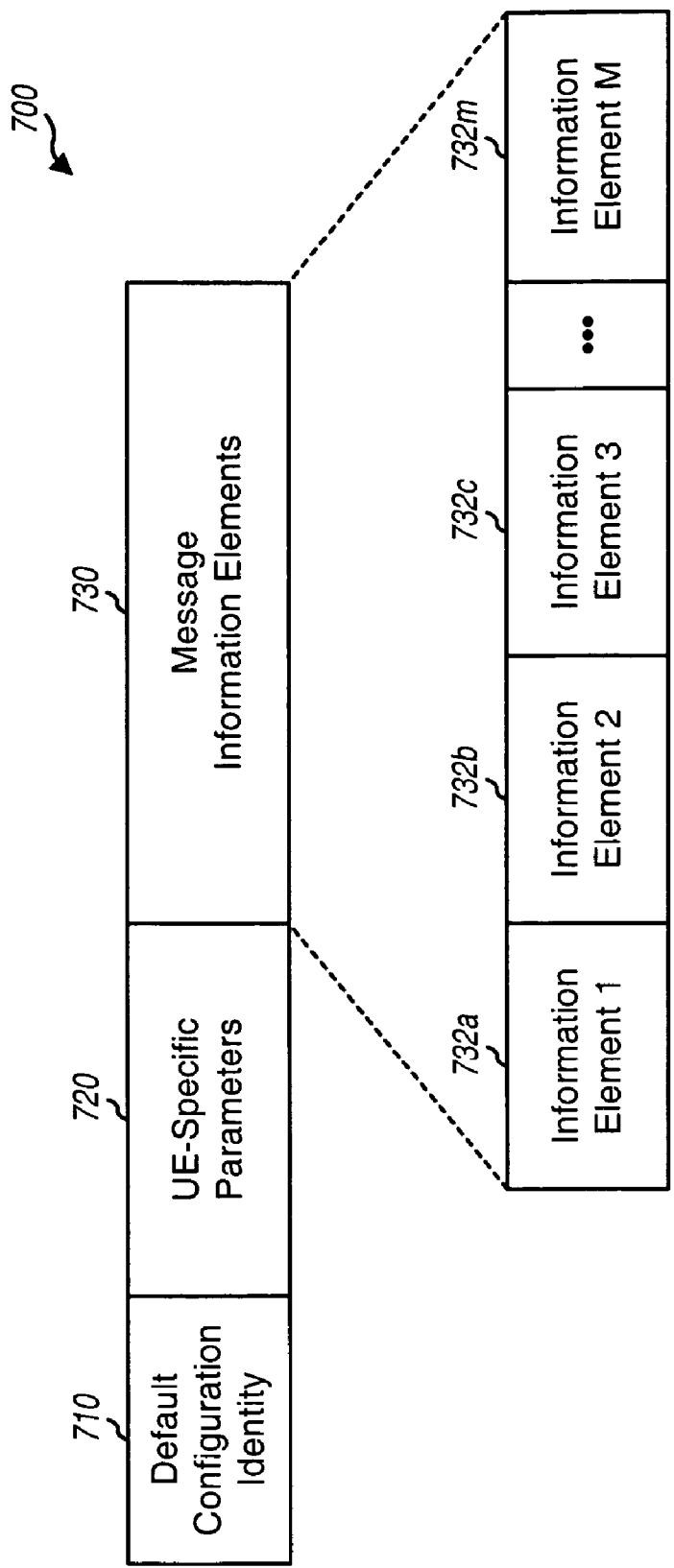
FIG. 7 shows an exemplary Reconfiguration message.

FIG. 7 shows an exemplary Reconfiguration message 700 that supports default configurations with differential encoding. For this embodiment, message 700 includes an information element 710 that carries an identity for a default configuration, an information element 720 that carries UE-specific parameters, and information elements 730 for configuration information. A nested message structure may be used in which an information element at a given level may include one or more information elements at a next lower level. The UE-specific parameters are parameters that are likely to be different from UE to UE and hence may be explicitly sent in the Reconfiguration message instead of being covered by the default configuration. An example of a UE-specific parameter is an OVSF code for a physical channel assigned to a UE. Since no two UEs use the same OVSF code at the same time, this parameter may be explicitly sent in the Reconfiguration message. Information elements 730 may (1) be omitted for minimum signaling, (2) carry one or more information elements with the differences between the selected configuration and the default configuration for partial signaling, or (3) carry all of the information elements of the selected configuration for full signaling.

Tables 4, 5, and 6 list various information elements that may be included in the Reconfiguration message. These information elements are described in TS 25.331, V6.2.0. As Tables 4, 5, and 6 indicate, many information elements may need to be sent with full signaling whereas only one or few information elements are sent with partial signaling, which can greatly shorten the message size.

TABLE 4

Radio Bearer Information Elements

| Default configuration identity | Predefined RB configuration | RB information to be affected |
|---|---|---|
| Downlink RLC STATUS info | RAB info | RB information to reconfigure |
| PDCP context relocation info | RAB info Post | RB information to release |
| PDCP info | RAB information for setup | RB information to setup |
| PDCP SN info | RAB information to reconfigure | RB mapping info |
| Polling info | NAS Synchronization indicator | RB with PDCP information |
| Predefined configuration identity | RB activation time info | RLC info |
| Predefined configuration status information | RB COUNT-C MSB information | Signalling RB information to setup |
| Predefined configuration status information compressed | RB COUNT-C information | Transmission RLC Discard |
| Predefined configuration value tag | RB identity | |

TABLE 5

Transport CH Information Elements

| Added or Reconfigured DL TrCH information | MAC-d Flow Identity | TFCS Removal Information |
|---|---|---|
| Added or reconfigured MAC-d flow | Power Offset Information | Transport channel identity |
| Added or Reconfigured UL TrCH information | Predefined TrCH configuration | Transport Format Combination |
| CPCH set ID | Quality Target | Transport Format Combination Set |
| Deleted DL TrCH information | Semi-static Transport Format Information | Transport Format Combination Set Identity |
| Deleted UE TrCH information | TFCI Field 2 Information | Transport Format Combination Subset |
| DL Transport channel information common for all transport channels | TFCS Explicit Configuration | Transport Format Set |
| DRAC Static Information | TFCS Information for DSCH (TFCI range method) | UL Transport channel information common for all transport channels |
| HARQ Info | TFCS Reconfiguration/ Addition Information | |

TABLE 6

Physical CH Information Elements

| Ac-to-ASC mapping | CPCH Status Indication mode | Downlink information for each radio link |
|---|---|---|
| AICH Info | CSICH Power offset | Downlink information for each radio link Post |
| AICH Power offset | Default DPCH Offset Value | Downlink PDSCH information |
| Allocation period info | Downlink channel-isation codes | Downlink rate matching restriction information |
| Alpha | Downlink DPCH info common for all RL | Downlink Timeslots and Codes |
| ASC setting | Downlink DPCH info common for all RL Post | DPCH compressed mode info |

TABLE 6-continued

Physical CH Information Elements

| | | |
|---|---|---|
| Ac-to-ASC mapping | CPCH Status Indication mode | Downlink information for each radio link |
| CCTrCH power control info | Downlink DPCH info common for all RL Pre | DPCH Compressed Mode Status Info |
| Cell and Channel Identity info | Downlink DPCH info for each RL | Dynamic persistence level |
| Cell parameters Id | Downlink DPCH info for each RL Post | FPACH info |
| Common timeslot info | Downlink DPCH power control information | Frequency info |
| Constant value | Downlink HS-PDSCH Information | HS-PDSCH Midamble Configuration |
| Constant value TDD | Downlink information common for all radio links | HS-PDSCH Timeslot Configuration |
| CPCH persistence levels | Downlink information common for all radio links Post | HS-SCCH Info |
| CPCH set info | Downlink information common for all radio links Pre | |

An exemplary implementation of the default configurations using ASN. 1 encoding defined in 3GPP Release 6 is shown below, where "r6" and "R6" stand for 3GPP Release 6.

```
r6message: : =SEQUENCE{
    CHOICE {defaultConfiguration1,
            defaultConfiguration2,
            defaultConfiguration3,
            ...
            defaultConfigurationN}          OPTIONAL,
    parametersUEspecific   ParametersUEspecific   OPTIONAL,
    r6message-IEs          R6message-IEs          OPTIONAL
    }
R6message-IEs : :=SEQUENCE{
    informationElement1    InformationElement1    OPTIONAL,
    informationElement2    InformationElement2    OPTIONAL,
    informationElement3    InformationElement3    OPTIONAL,
    informationElementM    InformationElementM    OPTIONAL,
    }
```

In the above implementation, "CHOICE" is an information element that can take on one of N values for N default configurations, where N>1. The "parametersUEspecific" information element carries the UE-specific parameters and has a format defined by the "ParametersUEspecific" structure. The "r6message-IEs" information element carries information elements for the selected configuration and has a format defined by the "R6message-IEs" structure. The "R6message-IEs" structure is a sequence of M optional information elements having the formats defined by the "InformationElement1" through "InformationElementM" structures.

If default configurations are not used, then the "CHOICE" information element would not be included in a Reconfiguration message. The normal way of sending the Reconfiguration message would be used, and this message would include all of the pertinent information elements in the "r6message-IEs" information element and may further include the "parametersUEspecific" information element.

If default configurations are used, then the default configuration would be indicated by the "CHOICE" information element, the UE-specific parameters would be included, if needed, in the "parametersUEspecific" information element. The "r6message-IEs" information element may be used to send values that differ from the default values for the default configuration. For example, only "informationElement2" may be included in the Reconfiguration message if this is the only information element that differs from the default configuration.

The set of default configurations may change over time due to various reasons. For example, some default configurations may not be used by any UTRAN, and it may be desirable to remove these configurations. As another example, it may be desirable to expand the set to include other configurations that are useful. In one embodiment, new configurations may be added to the default configuration set for a new release, but configurations that are already included in the set are not removed. For this embodiment, the default configuration set for the new release is a superset of, and is backward compatible with, default configuration sets for prior releases. The fact that default configurations are "permanent" may be taken into account in the selection of configurations for inclusion in the default configuration set. This embodiment may simplify the use of default configurations and may also simplify interoperability tests. In another embodiment, a set of default configurations may be defined for each new release and may be assigned a default configuration version. A UE may store a set of default configurations for the release supported by the UE. The UTRAN may store different sets of default configurations for different releases supported by the UTRAN, e.g., in a data structure designed to efficiently store these default configurations. For each UE, the UTRAN uses the set of default configurations supported by that UE.

Support for default configurations with differential encoding may be made mandatory for only the UE, or only the UTRAN, or both the UE and the UTRAN.

Figure 8:
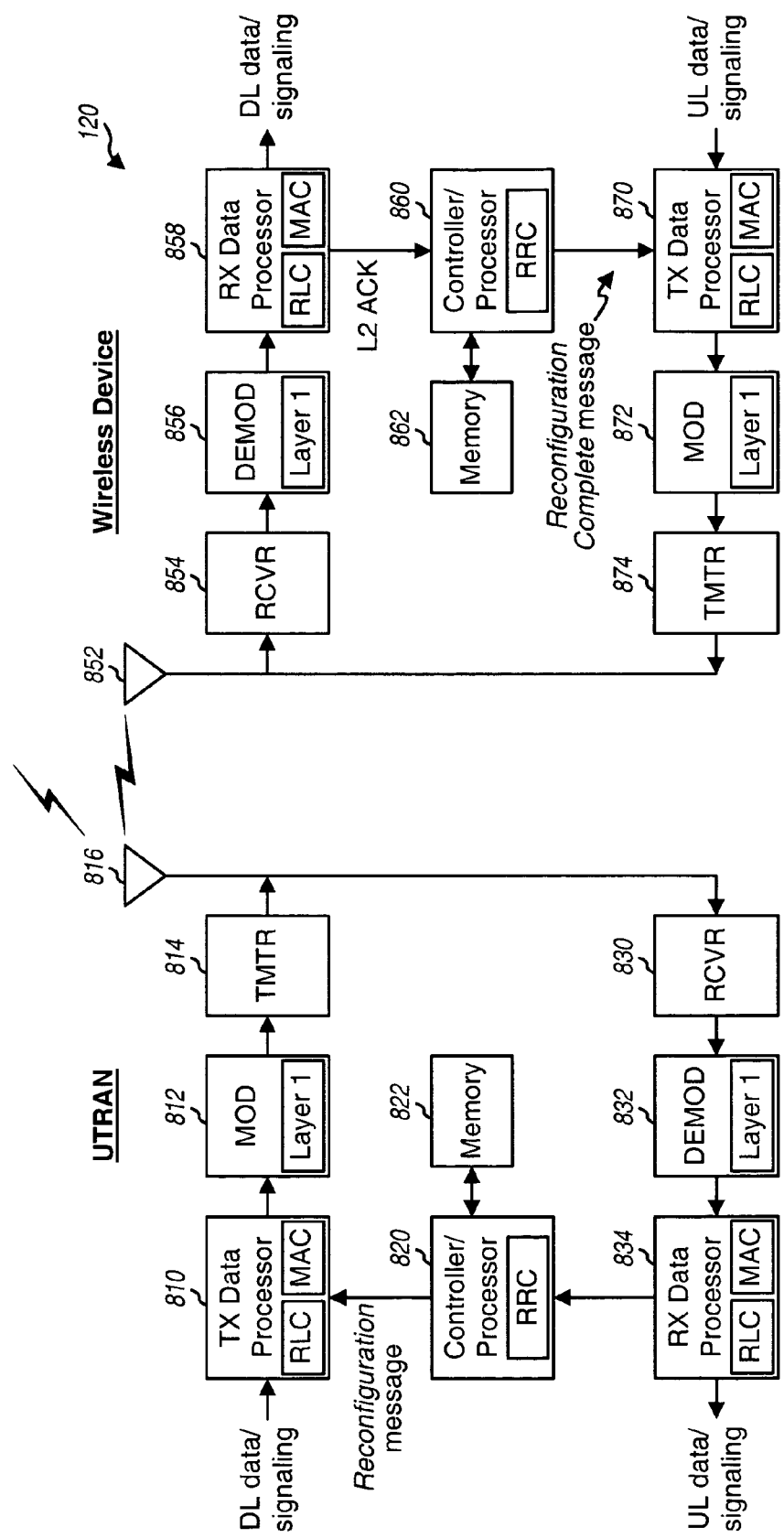
FIG. 8 shows a block diagram of a UTRAN and a wireless device.

FIG. 8 shows an embodiment of the UTRAN and wireless device (UE) 120. Each processing unit at the UTRAN may reside at a Node B or an RNC. On the downlink, a transmit (TX) data processor 810 at the UTRAN formats, encodes, and interleaves signaling and data for UE 120. A modulator (MOD) 812 channelizes/spreads, scrambles, and modulates the output from TX data processor 810 and provides a stream of chips. The processing for the signaling and data is described in 3GPP TS 25.321, TS 25.308, TS 25.212, and other 3GPP documents. A transmitter unit (TMTR) 814 converts the stream of chips to analog signals, amplifies, filters, and frequency upconverts the analog signals, and generates a downlink signal, which is transmitted via an antenna 816. The UTRAN can transmit signaling and data to multiple UEs simultaneously, but this is not shown in FIG. 8 for simplicity.

At UE 120, an antenna 852 receives the downlink signal and provides a received signal to a receiver unit (RCVR) 854. Receiver unit 854 filters, amplifies, frequency downconverts, and digitizes the received signal and provides data samples. A demodulator (DEMOD) 856 descrambles, channelizes/despreads, and demodulates the data samples and provides symbol estimates. Demodulator 856 may implement a rake receiver that can process multiple instances (or multipath components) of the received signal. A receive (RX) data processor 858 deinterleaves and decodes the symbol estimates, checks the received PDUs, and provides decoded data. The processing by demodulator 856 and RX data processor 858 is complementary to the processing by modulator 812 and TX data processor 810, respectively. The UTRAN and the UE perform processing for downlink transmission in accordance with the downlink logical, transport, and physical channels configured for the UE.

On the uplink, signaling and data are processed by a TX data processor 870, further processed by a modulator 872, conditioned by a transmitter unit 874, and transmitted via antenna 852. At the UTRAN, the uplink signal is received by antenna 816, conditioned by a receiver unit 830, processed by a demodulator 832, and further processed by an RX data processor 834 to recover the uplink signaling and data. The UTRAN and the UE perform processing for uplink transmission in accordance with the uplink logical, transport, and physical channels configured for the UE.

Controllers/processors 820 and 860 control the operation at the UTRAN and the UE, respectively. Memories 822 and 862 store data and codes used by controllers/processors 820 and 860, respectively. FIG. 8 shows the RRC layer being implemented by controllers/processors 820 and 860, the RLC and MAC layers being implemented by TX data processors 810 and 870 and RX data processors 834 and 858, and the physical layer (Layer 1) being implemented by modulators 812 and 872 and demodulators 832 and 856. In general, these layers may be implemented by any of the processing units shown in FIG. 8.

For reconfiguration, the UTRAN transmits a Reconfiguration message to the UE. Controllers/processors 820 and 860 perform reconfiguration at the UTRAN and the UE, respectively. Upon completing the reconfiguration, the UE transmits a Reconfiguration Complete message to the UTRAN.

For clarity, the techniques for using default configurations with differential encoding have been described mainly for reconfiguration in the UTRAN. In general, these techniques may be used for configuring a call, reconfiguring a call, and so on. A call may also be referred to as a session or some other terminology. These techniques may also be used for other CDMA networks (which may implement other CDMA standards) and other types of wireless communication networks (e.g., TDMA and FDMA networks).

The techniques described herein may be implemented by various means. For example, these techniques may be implemented in hardware, software, or a combination thereof. For a hardware implementation, the processing units used to configure or reconfigure a call at the network side may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at the UE may also be implemented within one or more ASICs, DSPs, processors, and so on.

For a software implementation, the techniques described herein may be implemented with modules (e.g., procedures, functions, and so on) that perform the functions described herein. The software codes may be stored in a memory unit (e.g., memory unit 822 or 862 in FIG. 8) and executed by a processor (e.g., processor 820 or 860). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
  a memory to store a set of default configurations to use for communication; and
  a processor to select a configuration to use for communication with a wireless device, to ascertain differences, if any, between parameter values of the selected configuration and default parameter values of a default configuration, the default configuration determined from among the set of default configurations having a least number of parameter value differences with the selected configuration, each default configuration including a distinct set of default parameters values, to most closely match the selected configuration in the set of default configurations, and to send an identity for the default configuration and the differences, if any, to convey the selected configuration.

2. The apparatus of claim 1, wherein each default configuration is associated with default values for a respective set of information elements, the default values being the set of parameter values for the default configuration.

3. The apparatus of claim 2, wherein the processor ascertains information elements having different values in the selected configuration and the default configuration.

4. The apparatus of claim 3, wherein the processor forms a reconfiguration message with the identity for the default configuration and the information elements having different values.

5. The apparatus of claim 4, wherein the processor forms the reconfiguration message further with at least one parameter that is specific to the wireless device.

6. The apparatus of claim 1, wherein the processor sends only the identity for the default configuration if there are no differences between the selected configuration and the default configuration.

7. The apparatus of claim 1, wherein the processor sends the selected configuration, instead of the default configuration and the differences, if the differences exceed a threshold.

8. The apparatus of claim 1, wherein the processor selects the configuration in response to a change in communication requirements.

9. The apparatus of claim 8, wherein the change in communication requirements is due to a change in data rate, a change in service, a change in quality of service (QoS), or a combination thereof.

10. The apparatus of claim 1, wherein the processor selects the configuration in response to a change in state within a connected mode.

11. The apparatus of claim 1, wherein the processor selects the configuration in response to a transmission from an idle mode to a connected mode.

12. The apparatus of claim 1, wherein the processor selects the configuration in response to a handover from a first radio access technology to a second radio access technology.

13. A method comprising:
  identifying a default configuration determined in a processor from among a set of default configurations having a least number of differences of information elements with a selected configuration, each default configuration including a distinct set of default parameters values, to most closely match the selected configuration for use in communication and further identifying differences, if any, between parameter values of the selected configuration and default parameter values of the default configuration; and
  sending an identity for the default configuration and the differences, if any, to convey the selected configuration.

14. The method of claim 13, wherein the differences comprises information elements having different values in the selected configuration and the default configuration.

15. The method of claim 14, further comprising:
forming a reconfiguration message with the identity for the default configuration and the information elements having different values.

16. The method of claim 13, wherein the selected configuration comprises a configuration in response to a change in communication requirements resulting from a change in data rate, a change in service, a change in quality of service (QoS), a change in state within a connected mode, a transition from an idle mode to the connected mode, a handover from a first radio access technology to a second radio access technology, or a combination thereof.

17. An apparatus comprising:
means for identifying a default configuration determined from among a set of default configurations having a least number of differences of information elements with a selected configuration, each default configuration including a distinct set of default parameters values, to most closely match the selected configuration for use in communication and further identifying differences, if any, between parameter values of the selected configuration and default parameter values of the default configuration; and
means for sending an identity for the default configuration and the differences, if any, to convey the selected configuration.

18. The apparatus of claim 17, wherein the differences comprises
information elements having different values in the selected configuration and the default configuration.

19. The apparatus of claim 18, further comprising:
means for forming a reconfiguration message with the identity for the default configuration and the information elements having different values.

20. A non-transitory processor readable medium storing instructions operable to:
identify a default configuration from among a set of default configurations having a least number of differences of parameter values with a selected configuration, each default configuration including a distinct set of default parameters values, to most closely match the selected configuration for use in communication and further identifying differences, if any, between parameter values of the selected configuration and default parameter values of the default configuration; and
send an identity for the default configuration and the differences, if any, to convey the selected configuration.

21. The processor readable medium of claim 20, further storing instructions operable to:
ascertain information elements having different values in the selected configuration and the default configuration; and
form a reconfiguration message with the identity for the default configuration and the information elements having different values.

22. An apparatus comprising:
a memory to store a set of default configurations; and
a processor to receive an indication of a change in communication requirements for a wireless device operating in a connected mode, to select a default configuration determined from among the set of default configurations having a least number of differences of parameter values with a selected configuration, each default configuration including a distinct set of default parameters values, to most closely match the communication requirements, to ascertain differences, if any, between default parameter values of the selected default configuration and parameter values of the communication requirements, and to send the default configuration and the differences, if any, to the wireless device.

23. The apparatus of claim 22, wherein the change in communication requirements is due to a change in state within the connected mode.

24. The apparatus of claim 22, wherein the change in communication requirements is due to a change in data rate, a change in service, a change in quality of service (QoS), or a combination thereof.

25. A method comprising:
receiving an indication of a change in communication requirements for a wireless device operating in a connected mode;
selecting a default configuration determined in a processor from among a set of default configurations having a least number of differences of parameter values with a selected configuration, each default configuration including a distinct set of default parameters values, to most closely match the communication requirements;
ascertaining differences, if any, between default parameter values of the selected default configuration and parameter values of the communication requirements; and
sending the default configuration and the differences, if any, to the wireless device.

26. The method of claim 25, wherein the receiving the indication of the change in communication requirements comprises
receiving the indication of the change in communication requirements due to a change in data rate, a change in service, a change in quality of service (QoS), a change in state within the connected mode, or a combination thereof.

27. An apparatus comprising:
means for receiving an indication of a change in communication requirements for a wireless device operating in a connected mode;
means for selecting a default configuration determined from among a set of default configurations having a least number of differences of parameter values with a selected configuration, each default configuration including a distinct set of default parameters values, to most closely match the communication requirements;
means for ascertaining differences, if any, between default parameter values of the selected default configuration and parameter values of the communication requirements; and
means for sending the default configuration and the differences, if any, to the wireless device.

28. An apparatus comprising:
a memory to store a set of default configurations; and
a processor to receive a message containing an identity for a default configuration, to obtain the default configuration from the memory based on the identity, to ascertain whether the message contains differences between default parameter values of the default configuration and parameter values of a selected configuration, the default configuration determined from among the set of default configurations having a least number of differences of parameter values with the selected configuration, each default configuration including a distinct set of default parameters values, to most closely match the selected configuration, and to replace default parameter values for the default configuration with the differences, if any, sent in the message.

29. The apparatus of claim 28, wherein the message contains the identity and no differences, and wherein the processor uses the default configuration for communication.

30. The apparatus of claim 28, wherein processor uses the default configuration with the differences for communication.

31. The apparatus of claim 28, wherein each default configuration is associated with default values for a respective set of information elements, the default values being the set of parameter values for the default configuration.

32. The apparatus of claim 31, wherein the processor extracts from the message information elements containing the differences, replaces default values for information elements in the default configuration with values for the extracted information elements, and retains default values for information elements in the default configuration not sent in the message.

33. The apparatus of claim 28, wherein the processor receives the message in response to a change in communication requirements.

34. The apparatus of claim 28, wherein the processor receives the message in response to a change in state within a connected mode.

35. The apparatus of claim 28, wherein the processor receives the message in response to a transmission from an idle mode to a connected mode.

36. The apparatus of claim 28, wherein the processor receives the message in response to a handover from a first radio access technology to a second radio access technology.

37. A method comprising:
receiving a message having an identity for a default configuration and differences, if any;
obtaining, based on the identity, the default configuration determined in a processor from among a set of default configurations having a least number of differences of parameter values with a selected configuration, each default configuration including a distinct set of default parameters values, to most closely match the selected configuration for use in communication resulting in the differences, if any, between parameter values of the selected configurations and default parameter values of the default configuration; and
replacing default parameter values for the default configuration with the differences, if any, sent in the message.

38. The method of claim 37, wherein the replacing the parameter values for the default configuration comprises
extracting from the message information elements containing the differences, replacing default values for information elements in the default configuration with values for the extracted information elements, and
retaining default values for information elements in the default configuration not sent in the message.

39. The method of claim 37, wherein the receiving the message comprises
receiving the message having the identity for the default configuration in response to a change in communication requirements resulting from a change in data rate, a change in service, a change in quality of service (QoS), a change in state within a connected mode, a transition from an idle mode to the connected mode, a handover from a first radio access technology to a second radio access technology, or a combination thereof.

40. An apparatus comprising:
means for receiving a message having an identity for a default configuration and differences, if any;
means for obtaining, based on the identity, the default configuration determined from among a set of default configurations having a least number of differences of parameter values with a selected configuration, each default configuration including a distinct set of default parameters values, to most closely match the selected configuration for use in communication resulting in the differences, if any, between parameter values of the selected configurations and default parameter values of the default configuration; and
means for replacing default parameter values for the default configuration with the differences, if any, sent in the message.

41. The apparatus of claim 40, wherein the means for replacing the parameter values for the default configuration comprises
means for extracting from the message information elements containing the differences,
means for replacing default values for information elements in the default configuration with values for the extracted information elements, and
means for retaining default values for information elements in the default configuration not sent in the message.

42. A non-transitory processor readable medium storing instructions operable in a wireless device to:
receive a message having an identity for a default configuration and differences, if any;
obtain, based on the identity, the default configuration determined from among a set of default configurations having a least number of differences of parameter values with a selected configuration, each default configuration including a distinct set of default parameters values, to most closely match the selected configuration for use in communication resulting in the differences, if any, between parameter values of the selected configurations and default parameter values of the default configuration; and
replace default parameter values for the default configuration with the differences, if any, sent in the message.

43. The processor readable medium of claim 42, further storing instructions operable to:
extract from the message information elements containing the differences; replace default values for information elements in the default configuration with values for the extracted information elements; and
retain default values for information elements in the default configuration not sent in the message.

44. An apparatus comprising:
a memory to store a set of default configurations; and
a processor to receive a reconfiguration message in response to a change in communication requirements for a wireless device operating in a connected mode, to extract an identity for a default configuration from the reconfiguration message, to obtain the default configuration from the memory based on the identity, to ascertain differences, if any, between default parameters values of the obtained default configuration and parameters values of the communication requirements, the obtained default configuration determined from among the set of default configurations having a least number of differences of parameter values with a selected configuration, each default configuration including a distinct set of default parameters values, to most closely match the communication requirements, and to use the default configuration and the differences, if any, for communication.

45. The apparatus of claim 44, wherein the change in communication requirements is due to a change in state in the connected mode.

46. The apparatus of claim 44, wherein the change in communication requirements is due to a change in data rate, a change in service, a change in quality of service (QoS), or a combination thereof.

47. A method comprising:
receiving a reconfiguration message in response to a change in communication requirements for a wireless device operating in a connected mode;
extracting an identity for a default configuration from the reconfiguration message, the default configuration being from a set of default configurations;
obtaining the default configuration from a memory based on the identity;
ascertaining differences, if any, between default parameter values of the obtained default configuration and parameter values of the communication requirements, the obtained default configuration determined from among the set of default configurations having a least number of differences of parameter values with a selected configuration, each default configuration including a distinct set of default parameters values, to most closely match the communication requirements; and
using the default configuration and the differences, if any, for communication.

48. An apparatus comprising:
means for receiving a reconfiguration message in response to a change in communication requirements for a wireless device operating in a connected mode;
means for extracting an identity for a default configuration from the reconfiguration message, the default configuration being from a set of default configurations;
means for obtaining the default configuration from a memory based on the identity;
means for ascertaining differences, if any, between default parameter values of the obtained default configuration and parameter values of the communication requirements, the obtained default configuration determined from among the set of default configurations having a least number of differences of parameter values with a selected configuration, each default configuration including a distinct set of default parameters values, to most closely match the communication requirements; and
means for using the default configuration and the differences, if any, for communication.

* * * * *